United States Patent [19]

Apostolos

[11] Patent Number: 4,641,143

[45] Date of Patent: Feb. 3, 1987

[54] TWO-DIMENSIONAL ACQUISITION SYSTEM USING CIRCULAR ARRAY

[75] Inventor: John T. Apostolos, Merrimack, N.H.

[73] Assignee: Sanders Associates, Inc., Nashua, N.H.

[21] Appl. No.: 536,477

[22] Filed: Sep. 28, 1983

[51] Int. Cl.$^4$ .......................... G01S 5/04; G01S 3/16; G06G 7/19

[52] U.S. Cl. .................................... 342/445; 342/378; 342/5; 364/827; 364/516; 364/726; 324/77 B

[58] Field of Search ............... 343/368, 370, 371, 372, 343/373, 377, 451, 445, 378, 5 FT, 417; 364/516, 827, 726; 367/59–63, 121; 324/77 B

[56] References Cited

U.S. PATENT DOCUMENTS

| | | | |
|---|---|---|---|
| 3,872,293 | 3/1975 | Green | 364/827 |
| 4,163,978 | 8/1979 | Shepherd et al. | |
| 4,203,114 | 5/1980 | Gerst et al. | |
| 4,209,791 | 6/1980 | Gerst et al. | |
| 4,216,475 | 8/1980 | Johnson | |
| 4,254,417 | 3/1981 | Speiser | 343/378 |
| 4,263,597 | 4/1981 | Bentley et al. | |
| 4,338,605 | 7/1982 | Mims | |
| 4,382,259 | 5/1983 | Becavin et al. | |

Primary Examiner—Theodore M. Blum
Assistant Examiner—Gregory C. Issing
Attorney, Agent, or Firm—Louis Etlinger; Stanton D. Weinstein

[57] ABSTRACT

A frequency-and-direction-finding system (10) employing a circular array (12) performs a two-dimensional Fourier transformation in space and time on the signals from the individual elements. The results of the transformation are fed to multipliers (22) that multiply them by correction factors that are derived from antenna patterns of the array but do not include the bearing-dependent factors in those systems. The result is an ensemble of values whose relative phases represent a spatial frequency proportional to the bearing angle of the source. Accordingly, a second fast-Fourier-transform circuit (26) operating on this ensemble of values produces an output only on an output port corresponding to the bearing angle of the source.

4 Claims, 3 Drawing Figures

TWO-DIMENSIONAL ACQUISITION SYSTEM USING CIRCULAR ARRAY

BACKGROUND OF THE INVENTION

In the simultaneously filed application of Apostolos, Boland, and Stromswold for an Acquisition System Employing Circular Array, there is disclosed a method and apparatus for operating on the outputs of a circular array of antenna elements so that a device for generating a two-dimensional Fourier transform in space and time, such as a two-dimensional compressive receiver, indicates the directions and frequencies of many signals simultaneously when fed the resultant signals. The Apostolos et al. application is hereby incorporated by reference.

Reference may be had to that application for details of the system. Briefly, however, the outputs of the circular array of that system are fed to a device for generating a spatial Fourier transform. The resultant outputs representing each spatial-frequency component are fed to a separate correction circuit associated with that spatial frequency. Each correction circuit is associated with a different integer, and its transfer function is the frequency-independent factor of the antenna pattern generated by driving the elements of the linear array with signals whose relative phases advance, in one circuit around the array, through a number of complete cycles that is equal to the integer with which the correction circuit is associated.

As is pointed out in the Apostolos et al. specification, the correction networks can be either analog or digital in form, the choice typically depending on whether the initial Fourier transformation is performed in an analog manner or digitally. For relatively high frequencies, the correction circuits may be difficult to implement digitally, because it is necessary to perform a convolution of the spatial-transform outputs with the impulse response corresponding to the correction-circuit transfer function. Also, since the number of correction networks is equal to the number of array elements, the hardware cost associated with implementation of the correction networks can be significant if each individual correction network requires complicated circuitry.

It is among the objects of the present invention to permit the correction networks to be implemented, when the initial transformation is performed digitally, without convolution and, when the initial transformation is performed in an analog manner, without frequency-dependent circuitry.

SUMMARY OF THE INVENTION

The foregoing and related objects are achieved in a device that performs both the initial spatial Fourier transformation and a temporal Fourier transformation before the results are fed to the correction network. At any given time, therefore, the correction-network inputs represent spatial-frequency components of a single temporal frequency. As a consequence, the correction networks are only required to deal with a single temporal frequency at a time. In a digital implementation, therefore, it is only necessary for the correction network to multiply the received signal at a given instant by the single complex number representing the value of the transfer function at the frequency received at that instant. Thus, each digital output of the initial transformation circuit only requires a single complex-number multiplication, rather than a complete convolution of overlapped sequences of the transform-circuit output with a digitized impulse response. In an analog implementation, the typical correction networks can be in the form of analog multipliers that multiply the outputs of, say, a two-dimensional compressive receiver by intermediate-frequency signals of time-varying amplitudes and phases.

The outputs of the correction networks are fed to a device for performing a second spatial Fourier transformation without performing a temporal transformation. Like the output of the embodiment illustrated in the Apostolos et al. application mentioned above, the output of a system of this invention directly indicates the directions of several signal sources simultaneously without requiring an adjustment for temporal frequency.

DETAILED DESCRIPTION OF THE PREFERRED EMBODIMENT

Figure 1:
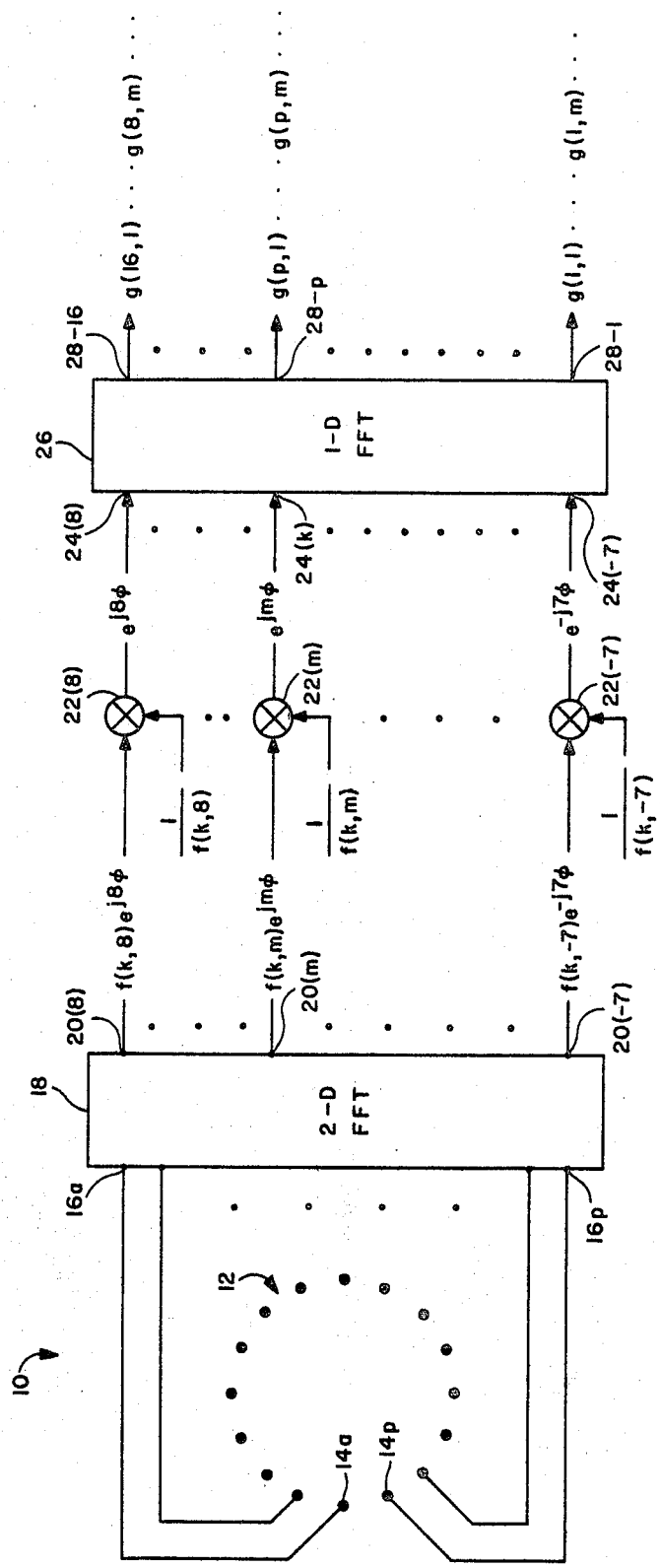
FIG. 1 is a block diagram of the system of the present invention.

A system 10 illustrated in FIG. 1 processes signals from a circular antenna array 12 and feeds the results to a one-dimensional fast-Fourier-transform module 26, which produces a series of complex-number outputs that indicate the direction and temporal frequency of a source whose signals are sensed by the array 12.

The array 12 illustrated in FIG. 1 is a simple circular array of antenna elements 14a-14p, each of which receives isotropically in the plane of the array 12. The outputs of the antenna elements 14 are received at associated input ports 16a-p of a two-dimensional fast-Fourier-transform module 18. The signals will typically be coupled to the transform circuit 18 by means of intervening circuitry, such as band-pass filters and mixers for frequency translation. The module 18 not only includes the basic circuitry for computing Fourier transforms but also has sample-and-hold circuitry and analog-to-digital-conversion circuitry. It may also have circuitry for weighting the inputs to reduce sidelobes and circuitry for packing the input samples in an even-/odd manner to store the input signals as complex numbers.

The transform circuit 18 typically includes a separate fast-Fourier-transform (FFT) module for each input port 16. Each of these modules computes the temporal Fourier transform of the sampled input signal. A further FFT module processes the outputs of these temporal FFT modules to generate a spatial Fourier transformation of the ensemble produced by the temporal FFTs together. The digital outputs of the spatial FFT module appear on the output terminals 20 of the two-dimensional FFT circuit 18.

The FFT circuit 18 processes 2N samples at a time in each temporal FFT module. After conversion to digital form, the 2N samples are typically packed in an even-/odd manner to produce N complex values. Each temporal FFT module thus performs a temporal Fourier transformation on a series of N complex values to produce an output stream of N values. At a given time, the values present on the output ports 20 of the two-dimensional FFT circuit 18 represents the values of the transform at one particular temporal-frequency value throughout the range of spatial-frequency values. The next set of values at the output ports 20 represents the full range of spatial-frequency values for the next value of temporal frequency, and this progression continues until outputs are produced for all N temporal-frequency values. The procedure then starts over again with the first temporal-frequency value.

For simplicity of description, we will assume that there is a single signal source transmitting a single frequency that is at or translated to the kth harmonic of the reciprocal of the period required for 2N samples, where k is less than N. The assumption of a single source results in no loss of generality, because the operations performed by the circuitry in FIG. 1 approximate linear operations, so the results of signals sent from different directions can merely be added together.

I have found that the value at a given time produced at the mth output port 20(m) can be expressed as $f(k,m)e^{jm\Phi}$, where k is the number of the frequency component currently issuing from the FFT circuit 18 and $\Phi$ is the bearing angle of the signal source. In other words, I have found that the output resulting from the two-dimensional Fourier transformation is a product of the first factor, f(k,n), which is independent of the bearing angle, and a second factor $e^{jm\Phi}$, which is a simple function of the bearing angle and has a phase angle that is a linear function of output-port position. According to the present invention, I multiply the kth output of the mth output port by the reciprocal of f(k,m) so that, if the frequency of the source signal is the kth harmonic of the reciprocal of the temporal-FFT period, the result will simply be $e^{jm\Phi}$.

This multiplication is performed in multipliers 22, which receive the values for the reciprocal of f(k,m) from, for instance, a read-only memory not shown in the drawings. For ease of understanding, the drawing illustrates a number of circuits 22 for complex digital multiplication that is equal to the number of output ports of the FFT circuit 18. As a practical matter, it may be simpler to provide a single complex-multiplication circuit for all of the output ports and multiplex the various inputs and outputs; each complex multiplication can be performed much more quickly than the Fourier transformations that generate its inputs.

Clearly, the retrieval of the reciprocal values for f(k,m) must be synchronized with the operation of the FFT circuit 18, and control circuitry is accordingly employed to ensure the synchronism. For the sake of simplicity, however, such circuitry is not shown in the drawing.

The outputs of the multipliers 22 differ from each other by a phase relationship that is linear in multiplier position and bearing angle. That is, the ensemble of values at the multiplier outputs has a phase gradient that is linear in bearing angle. Accordingly, a further spatial Fourier transformation will indicate the bearing angle of the signal source. The output of each multiplier 22 is therefore applied to a corresponding input port 24 of a one-dimensional FFT module 26. Like FFT circuitry 18, FFT circuit 26 may also include circuitry for weighting its inputs to reduce the amplitudes of side lobes in its outputs. FFT circuit 26 performs a spatial Fourier transformation that results in negligible values at all except either a single one of its output ports 28 or a pair of adjacent ports. The position of the one or two output ports 28 containing non-negligible output values indicates the bearing angle of the source.

As was mentioned above, the foregoing discussion assumes a single source radiating at a single frequency. In actual operation, of course, the signals sensed by the array 12 will typically come from many sources. Accordingly, the description above applies to the signals from each of those sources, and the results, since the system approximates a linear system, can be added. Thus, there typically are many non-negligible outputs of FFT module 26. These represent many sources, and the presence of many outputs is suggested by the g(p,m)'s in FIG. 1.

Figure 2:
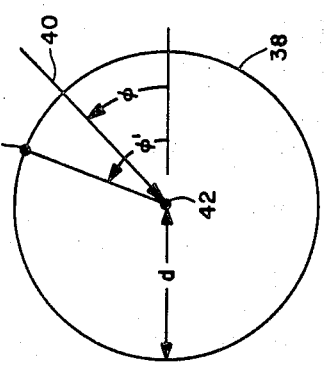
FIG. 2 is a diagram illustrating the geometry of the antenna array.

The values of the f(k,m)'s are derived from the geometry of the antenna array 12. The array 12 of discrete elements 14 is a discrete approximation of a continuous circular array 38 illustrated in FIG. 2. The radiation giving rise to the signals on the array arrives in a direction indicated by line 40 in array 38 at an angle $\Phi$. As was explained in the Apostolos et al. application mentioned above, if the signal at the center 42 of the array is given by $e^{j\omega t}$, then the value of the signal at a point 44 at an angle $\Phi'$ is given by the following expression:

$$e^{j\beta d\cos(\Phi'-\Phi)}e^{j\omega t} \qquad (1)$$

where $\beta$ is the wave number—i.e., is equal to the radian frequency divided by the speed of light—and d is the radius of the circular antenna array 12.

For the sake of simplicity, we will assume that the source radiates at a harmonic of the reciprocal of the FFT period. Therefore, if the FFT period is T and $\omega_0 = 2\pi/T$, then the temporal Fourier transformation is given by the following expression:

$$E(j\omega) = \frac{\omega_0}{2\pi} \int_{-\pi/\omega_0}^{\pi/\omega_0} e^{j\omega t} e^{j\beta d\cos(\Phi'-\Phi)} e^{jk\omega_0 t} dt \qquad (2)$$

where k is a positive integer less than N.

Since the temporal FFT module evaluates the expression given by equation (2) only at values of $\omega = k\omega_0$, equation (2) results in a value of zero at all values of $\omega$ except $k\omega_0$. Therefore, the evaluation of the expression of equation (2) yields an output for only one temporal-frequency component:

$$E(j\omega) = e^{j\beta d\cos(\Phi-\Phi')}, \omega = k\omega_0 \qquad (3)$$

It may be helpful to observe that the signal was expressed in equation (1) in the complex-number form ordinarily employed in such calculations. Of course, the physical interpretation of this complex number is merely a field whose intensity is proportional to the real part of this expression. However, as was mentioned above, the FFT circuit 18 typically stores the sampled values as complex numbers, so the numbers employed in the actual calculations in the circuit are the complete complex numbers represented in the foregoing equations, not just their real parts.

It should be noted that the expression of equation (3) is dependent on the antenna element 14 from which the signal is received; $\Phi'$ is determined by the position of the antenna element. The spatial-FFT module of circuit 18 performs a spatial Fourier transformation of the expression of equation (3) as a function of $\Phi'$. As was explained in the Apostolos et al. application mentioned above, the result of this spatial Fourier transformation is given by the expression:

$$E(k,m) = j^m e^{jm\Phi} J_m\left(\frac{k\omega_o d}{c}\right) \quad (4)$$

Removing the bearing-angle-dependent factor from this expression yields the value for f(k,m), which is the value that we sought:

$$f(k,m) = j^m J_m\left(\frac{k\omega_o d}{c}\right) \quad (5)$$

At this point, a couple of observations are in order. The first relates to the physical meaning of the expression of equation (4). The expression of equation (4) is actually the antenna pattern that is generated when all the antenna elements are driven such that an element at angle $\Phi'$ carries a signal equal to $\cos(k\omega_o t + m\Phi')$. This result follows from the definition of the spatial Fourier transformation. Thus, although the specific expression of equation (5) applies to the specific geometry of FIG. 1, the same principle applies to any angularly symmetrical array; the factor f(k,m) is equal to the bearing-angle-independent factor in the antenna pattern that results when the elements are driven at a frequency of $k\omega_o$ and their phases progress with position at a rate that completes m cycles in a single circuit of the array.

The second observation is that the type of correction performed by the multipliers 22 is very simple to implement; it requires no convolution in a digital system and no network with a complicated frequency response in an analog system. In a digital system, the operation is a simple complex-number multiplication. In an analog system, the function of the two-dimensional FFT circuit 18 is typically performed by a two-dimensional compressive receiver, which includes, among other components, a repetitively swept local oscillator. The output of the receiver in response to a single-frequency plane-wave signal at the array 12 is a pulse of a.c. signal at the compressive-receiver center frequency. The pulse's time of occurrence within a local-oscillator sweep indicates the frequency of the plane-wave signal. The analog-system correction circuits are typically analog multipliers that multiply the compressive-receiver outputs by intermediate-frequency signals whose amplitudes and phases at a given time t during a local-oscillator sweep are given by $$f(t,m) = j^m J_m\left(\frac{\omega d}{c}\right) \quad (6)$$

where $\omega$ is the radian frequency associated by the compressive receiver with the given time t. Equation (6) is not frequency dependent, although it includes $\omega$ in the Bessel-function argument. This is because $\omega$ does not represent the frequency of the signal that the correction network receives. Instead, it merely states a time dependence in terms of the plane-wave frequency associated with the time. Thus, the correction circuits in an analog system, like those in the digital system, are simply multipliers and function generators.

Figure 3:
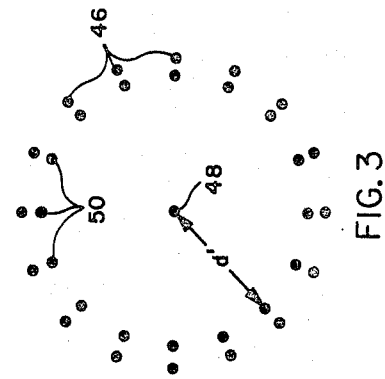
FIG. 3 is a diagram illustrating an alternate antenna array.

FIG. 3 illustrates an alternate arrangement of the antenna array. The array of FIG. 3 has antenna elements 46 at a distance d from the center 48. Unlike array 12 of FIG. 1, however, the array of FIG. 3 further includes interior reflecting elements 50. Each interior element 50 is disposed very close to an associated outer element 46, and the signals from two associated elements are combined in the manner described in the Apostolos et al. application so that, instead of receiving isotropically in the plane of the array, pairs of associated elements have cardioid patterns.

Such an array may be preferable in broadband versions of the system of FIG. 1. This can be understood when the values of f(k,m) for the array of FIG. 1 are considered. The function f(k,m) includes an mth-order Bessel function of the first kind, which has zeros for certain values of its argument. Thus, the reciprocal of f(k,m) has an infinite value at these points. Of course, it is impossible to realize a system employing such a value, so a practical realization of the system of FIG. 1 would give inaccurate results for some values of temporal frequency if the frequency range were too wide. However, it can be shown that the values of f(k,m) for the antenna pattern of FIG. 3 are as follows:

$$f(k,m) = j^m \frac{k\omega_o}{c}(d-d')\left[J_m\left(\frac{k\omega_o d}{c}\right) - jJ'_m\left(\frac{k\omega_o d}{c}\right)\right] \quad (7)$$

Since the Bessel function and its derivative do not have any common zeros, the expression of FIG. 7 never goes to zero.

From the foregoing discussion, it is apparent that the basic teachings of the Apostolos et al. application are quite readily carried out by employing the teachings of the present invention, particularly in embodiments, such as that illustrated in FIG. 1, employing digital circuits. However, the teachings of the present invention are not confined to digital embodiments. An analog version, for instance, might employ a two-dimensional compressive receiver followed by analog-multiplier correction circuits, as was mentioned above, and a Butler matrix might be employed to perform the second spatial transformation. Thus, powerful monitoring devices following the teachings of the present invention can be implemented with a wide variety of components.

I claim:

1. A method of finding the direction and frequency of a signal source whose signals are detected by a circular array of antenna elements, the method comprising the steps of:
   A. generating the two-dimensional Fourier transform in time and space of the signal ensemble consisting of the outputs of the circular array, thereby generating components each of which is associated with a spatial frequency and a temporal frequency;
   B. generating corrected components by applying to each component a correction function that differs only in the absence of the physical-angle-dependent phase factor from the inverse of the antenna pattern resulting when the antenna elements radiate signals whose temporal frequency is the temporal frequency associated with that component and whose phases advance with element position at the spatial frequency associated with that component; and
   C. performing a spatial Fourier transformation on the resulting ensemble of corrected components, the radial direction of the source of a given portion of the transform thereby being indicated by the spatial frequency of that portion.

2. A method as recited in claim 1 wherein:
A. the two-dimensional transformation is performed digitally to generate digital-number components; and
B. the step of generating corrected components consists essentially of performing a single digital complex multiplication on each digital-number component.

3. A device for finding the direction and frequency of a signal source whose signals are detected by a circular array of antenna elements, the device comprising:
A. a two-dimensional Fourier-transform circuit for receiving as its inputs the signals from the antenna elements and for generating as its outputs a two-dimensional Fourier transform in space and time of its inputs and thereby generating components each of which is associated with a spatial frequency and a temporal frequency;
B. correction circuits, connected to the two-dimensional Fourier-transform circuit, for generating corrected components by applying to each component a correction function that differs only in the absence of the physical-angle-dependent phase factor from the inverse of the antenna pattern resulting when the antenna elements radiate signals whose temporal frequency is the temporal frequency associated with that component and whose phases advance with element position at the spatial frequency associated with that component; and
C. a spatial-Fourier-transform circuit, connected to receive the corrected components from the correction circuits, for performing a spatial Fourier transformation on the corrected components, the radial direction of the source of a given portion of the transform thereby being indicated by its spatial frequency.

4. A device as recited in claim 3 wherein the two-dimensional transform circuit is a digital device that generates digital complex numbers as the components and wherein the correction circuits perform a single digital complex multiplication on each component.

* * * * *